(12) United States Patent
Tsai et al.

(10) Patent No.: US 10,104,186 B2
(45) Date of Patent: Oct. 16, 2018

(54) SERVICE DISCOVERY IN A SELF-MANAGED MOBILE COMMUNICATIONS NETWORK

(71) Applicant: MEDIATEK INC., Hsin-Chu (TW)

(72) Inventors: Yu-Che Tsai, Hsinchu (TW); Chao-Chun Wang, Taipei (TW); Yung-En Hsieh, Taipei (TW); I-Cheng Tsai, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 14/916,182

(22) PCT Filed: Aug. 13, 2015

(86) PCT No.: PCT/CN2015/086864
§ 371 (c)(1),
(2) Date: Mar. 2, 2016

(87) PCT Pub. No.: WO2016/023506
PCT Pub. Date: Feb. 18, 2016

(65) Prior Publication Data
US 2016/0198006 A1    Jul. 7, 2016

Related U.S. Application Data

(60) Provisional application No. 62/036,637, filed on Aug. 13, 2014, provisional application No. 62/037,113, filed on Aug. 14, 2014.

(51) Int. Cl.
*H04L 29/08* (2006.01)
*H04W 8/00* (2009.01)
(Continued)

(52) U.S. Cl.
CPC ............ *H04L 67/16* (2013.01); *H04L 67/104* (2013.01); *H04W 8/005* (2013.01); *H04W 84/12* (2013.01);
(Continued)

(58) Field of Classification Search
CPC .. H04L 67/16; H04L 67/104–67/1093; H04W 8/005; H04W 84/18; H04W 84/12
(Continued)

(56) References Cited

U.S. PATENT DOCUMENTS 6,917,976 B1 * 7/2005 Slaughter ............... G06F 9/465
707/999.009
7,620,026 B2 * 11/2009 Anschutz ............... G06Q 30/02
370/332
(Continued)

FOREIGN PATENT DOCUMENTS

| CN | 102577321 A | 7/2012 |
|---|---|---|
| CN | 102652424 A | 8/2012 |
| WO | 2007024918 A2 | 3/2007 |

OTHER PUBLICATIONS

"International Search Report" dated Nov. 11, 2015 for International application No. PCT/CN2015/086864, International filing date: Aug. 13, 2015.

*Primary Examiner* — Maharishi V Khirodhar
*Assistant Examiner* — Kenneth P Hunt
(74) *Attorney, Agent, or Firm* — Wolf, Greenfield & Sacks, P.C.

(57) ABSTRACT

A device-centric discovery mechanism requiring very low power consumption to find out information about each other directly in a self-managed mobile environment is proposed. A mobile communications device joins a self-managed communications network, which does not have a centralized management entity. The mobile device receives a request from a peer communications device about publishing a
(Continued)

service or subscribing to a service in accordance with a first schedule. The mobile device announce the request on behalf of the peer communications device in accordance with a second schedule. The service is then provided by a service advertiser to a service seeker in accordance with a third schedule.

19 Claims, 4 Drawing Sheets

(51) Int. Cl.
*H04W 84/18* (2009.01)
*H04W 84/12* (2009.01)

(52) U.S. Cl.
CPC .............. *H04W 84/18* (2013.01); *Y02B 60/50* (2013.01); *Y02D 70/00* (2018.01)

(58) Field of Classification Search
USPC ........................................................ 370/329
See application file for complete search history.

(56) References Cited

U.S. PATENT DOCUMENTS

| | | | | |
|---|---|---|---|---|
| 8,751,576 | B2* | 6/2014 | Michaelis | H04W 48/08 |
| | | | | 709/204 |
| 9,094,487 | B2* | 7/2015 | Altberg | H04M 7/006 |
| 9,485,647 | B2* | 11/2016 | Mohebbi | H04W 8/06 |
| 2008/0052340 | A1* | 2/2008 | Hallmark | G06Q 10/00 |
| | | | | 709/200 |
| 2010/0165896 | A1* | 7/2010 | Gong | H04W 52/0216 |
| | | | | 370/311 |
| 2011/0105151 | A1* | 5/2011 | Hall | A63F 13/10 |
| | | | | 455/456.3 |
| 2011/0153773 | A1* | 6/2011 | Vandwalle | H04W 8/005 |
| | | | | 709/217 |
| 2013/0322297 | A1* | 12/2013 | Dominguez | H04W 48/16 |
| | | | | 370/255 |
| 2014/0146762 | A1 | 5/2014 | Kuo | |
| 2014/0196112 | A1 | 7/2014 | Huang | |
| 2015/0019339 | A1* | 1/2015 | Van Phan | G06Q 30/02 |
| | | | | 705/14.58 |
| 2015/0195673 | A1* | 7/2015 | Rantapuska | H04W 4/06 |
| | | | | 455/3.05 |

* cited by examiner

SERVICE DISCOVERY IN A SELF-MANAGED MOBILE COMMUNICATIONS NETWORK

CROSS REFERENCE TO RELATED APPLICATIONS

This application is a national stage filing under 35 U.S.C. 371 of International Patent Application Serial No. PCT/CN2015/086864, filed Aug. 13, 2015, titled "SERVICE DISCOVERY IN A SELF-MANAGED MOBILE COMMUNICATIONS NETWORK", which claims priority under 35 U.S.C. § 119 from U.S. Provisional Application No. 62/036,637, filed on Aug. 13, 2014, and U.S. Provisional Application No. 62/037,113, filed on Aug. 14, 2014, the subject matter of which is incorporated herein by reference.

TECHNICAL FIELD

The disclosed embodiments relate generally to wireless network communications, and, more particularly, to service discovery in self-managed mobile communications networks.

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11n is an amendment that improves upon the previous IEEE 802.11 standards by adding multiple-input multiple-output antennas (MIMO). IEEE 802.11ac is an amendment to IEEE 802.11 that builds on 802.11n. Changes compared to 802.11n include wider channels (80 or 160 MHz versus 40 MHz) in the 5 GHz band, more spatial streams (up to eight versus four), higher-order modulation (up to 256-QAM vs. 64-QAM), and the addition of Multi-user MIMO (MU-MIMO). IEEE 802.11ad is an amendment that defines a new physical layer for 802.11 networks to operate in the 60 GHz millimeter wave spectrum. This frequency band has significantly different propagation characteristics than the 2.4 GHz and 5 GHz bands where Wi-Fi networks operate. IEEE 802.11ah defines a WLAN system operating at sub 1 GHz license-exempt bands. 802.11ah can provide improved transmission range compared with the conventional 802.11 WLANs operating in the 2.4 GHz and 5 GHz bands. 802.11ah can be used for various purposes including large-scale sensor networks, extended range hotspot, and outdoor Wi-Fi for cellular traffic offloading, whereas the available bandwidth is relatively narrow. IEEE 802.11ax is the successor to 802.11ac; it will increase the efficiency of WLAN networks. IEEE 802.11ax is currently at a very early stage of development and has the goal of providing 4× the throughput of 802.11 ac.

Wi-Fi has had, and is expected to continue, tremendous market growth. As the number of devices that support Wi-Fi increases, there is a corresponding value to creating more opportunities to connect using Wi-Fi. Similarly, as there are more opportunities to connect using Wi-Fi, there is increased value in adding Wi-Fi to more and more devices. The need for low power proximity-based device-to-device discovery and data exchange will increase as Wi-Fi continues to penetrate the mobile market. The mobile environment is a highly dynamic place, where there may be hundreds of possible devices of interest, which constantly change.

Neighbor Awareness Networking (NAN) is a device-centric discovery that allows devices to find out information from each other directly with very low power consumption. The Wi-Fi Alliance (WFA) Neighbor Awareness Networking (NAN) program will provide Wi-Fi technology that may be run in devices in background to make the devices 'neighbor aware'. It enables mobile devices to efficiently discover, as an example, people and services in their proximity. Wi-Fi Aware effectively in dense Wi-Fi environments and complements the high data rate connectivity of Wi-Fi by providing information about people and services in the proximity.

Neighbor Awareness Networking (NAN), based on proximity, does not require the real-time connection to a Wi-Fi infrastructure, servers, GPS or other geo-location, but instead uses direct device-to-device Wi-Fi to discover and exchange information. Wi-Fi Aware services offer significant advantages for mobile devices. Discovery of local users and services is based on proximity. Wi-Fi Aware uses direct device-to-device communication and does not require Internet connections or any form of communication infrastructure.

Consumer mobile Wi-Fi devices include Smart phones, tablets, and eventually feature phones, but will also include devices in the Smart Home, in industrial applications either as part of industrial equipment or as devices which communicate directly with each other using NAN. Today the vast majority of these platforms have Wi-Fi in their devices. These mobile Wi-Fi platforms usually have some other Wi-Fi devices within range. Those devices in range are not fixed; new ones come and go, even independent of the user moving. There are many opportunities for users to get interested in shared information and services, which are missed with traditional user-initiated service discovery. Opportunities exist also in geographical areas that have less developed infrastructure networks such as parts of the developing world, where some low-cost suitable substitute for an infrastructure is needed.

The existing device-to-device Wi-Fi communication lacks low power discovery mechanism for peer-to-peer networking. The Wi-Fi Direct pre-association service discovery mechanism does not scale well with hundreds of devices. A solution for service discovery with very low power consumption is sought in a self-managed mobile communications network.

SUMMARY

A device-centric discovery mechanism requiring very low power consumption to find out information about each other directly in a self-managed mobile environment is proposed. A mobile communications device joins a self-managed communications network, which does not have a centralized management entity. The mobile device receives a request from a peer communications device about publishing a service or subscribing to a service in accordance with a first schedule. The mobile device announce the request on behalf of the peer communications device in accordance with a second schedule. The service is then provided by a service advertiser to a service seeker in accordance with a third schedule.

In one embodiment, a service advertiser joins a self-managed mobile communications network. The service advertiser transmits a request to a peer communications device for providing a service in accordance with a first schedule. The service is then announced by the peer communications device on behalf of the service advertiser in the network, in accordance with a second schedule. The service advertiser negotiates a third schedule with one or more service subscribers. The service advertiser provides the service to a service subscriber in accordance with the third schedule.

In another embodiment, a service seeker joins a self-managed mobile communications network. The service seeker transmits a request to a peer communications device for seeking a service in accordance with a first schedule. The request is then announced by the peer communications device on behalf of the service seeker in the network, in accordance with a second schedule. The service seeker negotiates a third schedule with a service advertiser based on the first schedule. The service seeker accepts the service provided by the service advertiser in accordance with the third schedule.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
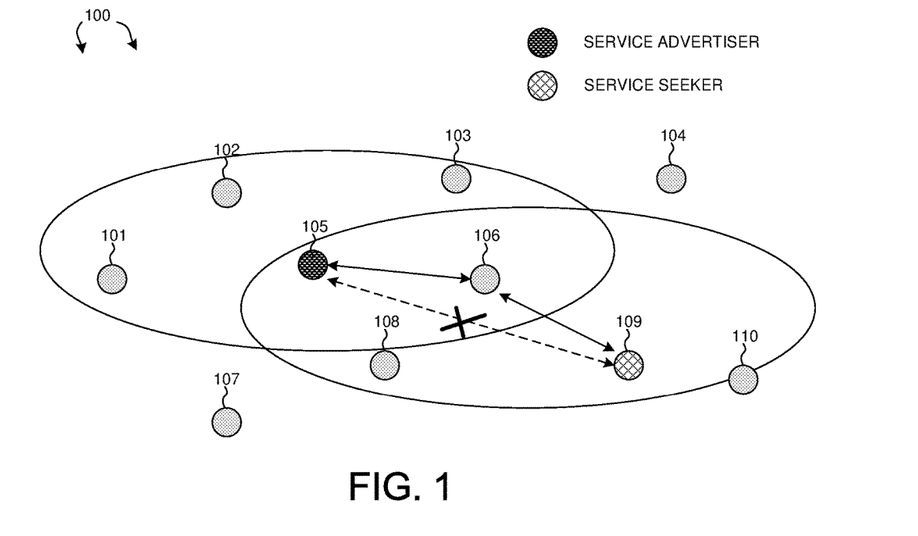
FIG. 1 illustrates a self-managed mobile communications network with enhanced service discovery in accordance with one novel aspect.

FIG. 1 illustrates a self-managed mobile communications network 100 with enhanced service discovery in accordance with one novel aspect. Mobile communications network 100 comprises a plurality of mobile communications devices 101 to 110. The self-managed mobile communications network does not have a centralized management entity. Any one of the mobile devices can initiate such a network, and other mobile devices who are interested can then join the network, e.g. based on location proximity or based on common interests etc. Among the plurality of mobile devices, some of them may provide specific services such as Wi-Fi access, streaming, printing, gaming, while others may seek for those specific services. A mobile device may provide services to neighboring devices while receiving services from neighboring devices. Because the mobile network can be a wide range group of mobile devices, devices may be hidden from each other belonging to the same network due to radio signals are not reachable.

In the example of FIG. 1, mobile device 105 is a service advertiser that provides a specific type of service. Mobile device 109 is a service seeker that needs the specific type of service. Mobile device 106 is another neighboring device that is physically located in between device 105 and device 106. Although device 105 and device 109 belong to the same network, it is still possible that their physical distance is longer than the maximum distance that can be reached via radio signals with acceptable signal quality. For example, spherical or ellipsoidal Wi-Fi fields can extend about 20-30 meters, while a typical outdoor Wi-Fi router can project its signal about 300 feet. As a result, the service advertiser 105 and the service seeker 109 may be hidden from each other and no knowing the service requests of each other if the two devices are located beyond a physical distance.

In accordance with one novel aspect, a neighboring mobile device, e.g., device 106, can be used to announce the service requests on behalf of its peer mobile devices. As illustrated in FIG. 1, mobile device 106 is located in between service advertiser 105 and service seeker 109. Mobile device 106 is able to receive radio signals from both mobile device 105 and mobile device 109. As a result, if mobile device 106 receives a service-advertising request from peer device 105, then device 106 can announce such request to other neighboring devices including service seeker 109. Similarly, if mobile device 106 receives a service-seeking request from peer device 109, then device 106 can also announce such request to other neighboring devices including service advertiser 105. By using mobile device 106 as a proxy agent to announce the service-advertising and/or service-seeking requests on behalf of its peer devices, the service advertising or seeking range can be extended twice as longer and the coverage is four-times larger. Furthermore, mobile device 106 may forward location and scheduling information related to the service such that the service advertiser 105 and the service seeker 109 can negotiate with each other before the service is provided and accepted.

Figure 2:
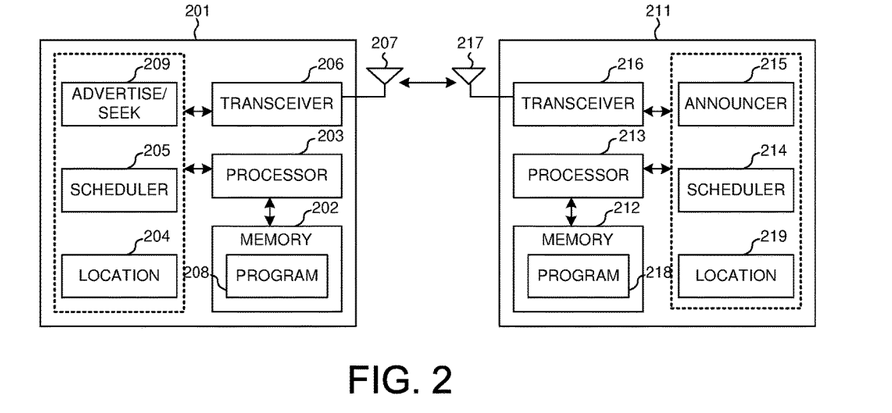
FIG. 2 is a simplified block diagram of a wireless transmitting device and a receiving device in accordance with one novel aspect.

FIG. 2 is a simplified block diagram of a mobile communications device 201 as a service advertiser or seeker and a mobile communications device 211 as a service announcer in accordance with a novel aspect. For wireless device 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in wireless device 201. Memory 202 stores program instructions and data 208 to control the operations of the wireless device.

Similar configuration exists in wireless device 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in wireless device 211. Memory 212 stores program instructions and data 218 to control the operations of the wireless device.

The wireless devices 201 and 211 also include several functional circuitries and modules that are configured to carry out some embodiments of the present invention. The different functional modules can be implemented by software, firmware, hardware, or any combination thereof. The function modules, when executed by the processors 203 and 213 (e.g., via executing program codes 208 and 218), for example, allow device 201 to advertise or request certain services to its neighboring devices, and allow device 211 to announce service advertisements and needs for its neighboring devices. In one example, device 201 is a service advertiser. Device 201 sends a request to device 211 for advertising a service via advertising module 209. The service is provided in accordance with a first schedule via scheduler 205. Device 201 also provides its location information via location module 204. In another example, device 201 is a service seeker. Device 201 sends a request to device 211 for seeking a service via seeking module 209. The service is needed in accordance with a second schedule via scheduler 205. Upon receive the request, device 211 announces the request on behalf of device 201 via announcer 215. The announcement is made in accordance with a second schedule via scheduler 214. Device 211 thus facilitates other neighboring devices in the network the service provided or needed to/from each other.

Figure 3:
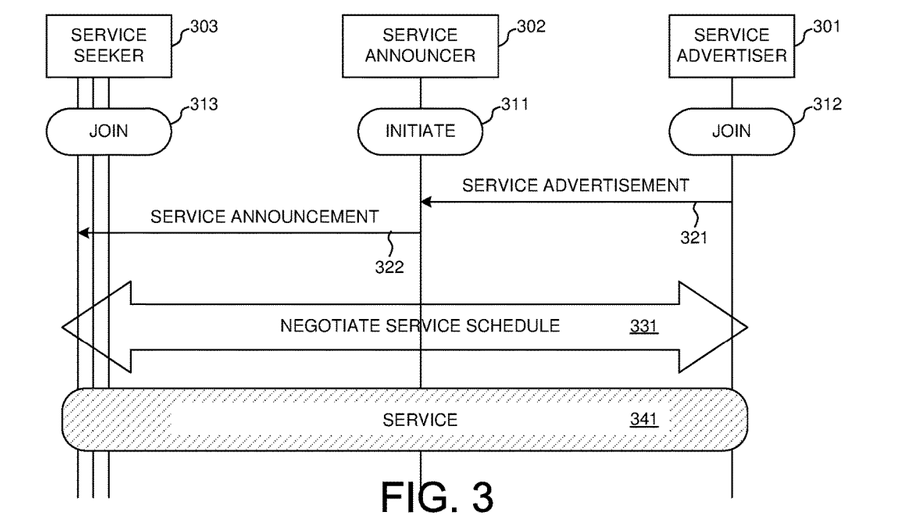
FIG. 3 is a signaling diagram of one embodiment of service discovery between a service advertiser, a service seeker, and a service announcer in a self-managed mobile communications network.

FIG. 3 is a signaling diagram of one embodiment of service discovery between a service advertiser 301, a service seeker 303, and a service announcer 302 in a self-managed mobile communications network. In step 311, service announcer 302 initiates the self-managed network and later on, service advertiser 301 and service seeker 303 joins the network in step 312 and step 313, respectively. Note that the self-managed network can be initiated by any of the neighboring devices, and each device determines whether to join the network based on location proximity or common interests. In the example of FIG. 3, service announcer 302 is located within the reach of radio signals from devices 301 and 303, while it is possible that devices 301 and 303 located beyond the reach of radio signals from each other and thus are hidden from each other. There may be multiple service seekers trying the subscribing the same service from advertiser 301.

In step 321, service advertiser 301 sends a broadcasting message to peer devices. The message contains a request for advertising a specific service provided by the service advertiser 301. The message also contains scheduling information with respect to the service. For example, the scheduling information may include a timetable and location and ranging information, which is related to when and where the specific service is provided. Upon receiving the request, service announcer 302 announces the request on behalf of the service advertiser in step 322. As a result, the service seeker 303 is able to receive the service advertisement from device 301 through device 302 acting as a proxy agent. Mobile device 302 may not always be available to act as a proxy agent for its neighbors. For example, mobile device 302 may have a timetable on when it is available for acting as a proxy agent due to power-saving concerns. When announcing the request in step 322, mobile device 302 may also include such timetable information so that its neighbors are aware of its announcing availability.

Once service seeker 303 receives the announced service advertisement, it can start to negotiate with service advertiser 301 to reach a final schedule that the service will be provided. In addition, multiple service seekers can negotiate with service advertiser 301 for such scheduling. In response, service advertiser 301 may allocate a fraction of time for one service subscriber, while allocating another fraction of time for another service subscriber. In one example, if devices 301 and 303 are physically closer than the maximum range provided by device 301, then device 303 can negotiate with device 301 based on the original timetable of device 301. In another example, if devices 301 and 303 are physically farther away than the maximum range provided by device 301, then device 303 can first move closer to device 301 and starts such negotiation based on the original timetable of device 301. In step 341, the service is provided by device 301 to device 303 according to the final schedule negotiated between them. Note that each device can go to power-saving mode based on their timetables, and only wakes up during pre-scheduled time for service advertising, announcing, and subscribing. This way, maximum power saving can be achieved for service discovery.

Figure 4:
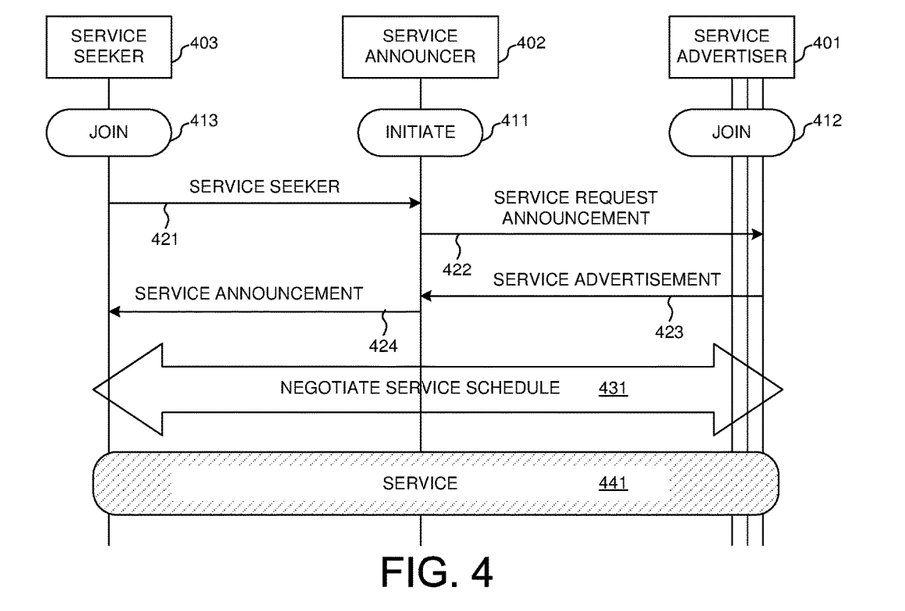
FIG. 4 is a signaling diagram of another embodiment of service discovery between a service advertiser, a service seeker, and a service announcer in a self-managed mobile communications network.

FIG. 4 is a signaling diagram of another embodiment of service discovery between a service advertiser 401, a service seeker 403, and a service announcer 402 in a self-managed mobile communications network. In step 411, service announcer 402 initiates the self-managed network and later on, service advertiser 401 and service seeker 403 joins the network in step 412 and step 413, respectively. Note that the self-managed network can be initiated by any of the neighboring devices, and each device determines whether to join the network based on location proximity or common interests. In the example of FIG. 4, service announcer 402 is located within the reach of radio signals from devices 401 and 403, while it is possible that devices 401 and 403 are located beyond the reach of radio signals from each other and thus are hidden from each other. There may be multiple service advertisers trying to advertise different services through service announcer 402.

In step 421, service seeker 403 sends a broadcasting message to peer devices. The message contains a request for subscribing a specific service needed by the service seeker 403. The message also contains scheduling information with respect to the service. For example, the scheduling information may include a timetable of the specific service is needed. Upon receiving the request, service announcer 402 announces the request on behalf of the service seeker in step 422. As a result, the service advertiser 401 is able to receive the service request from device 403 through device 402 acting as a proxy agent. Mobile device 402 may not always be available to act as a proxy agent for its neighbors. For example, mobile device 402 may have a timetable on when it is available for acting as a proxy agent due to power-saving concerns. When announcing the request in step 422, mobile device 402 may also include such timetable information so that its neighbors are aware of its availability.

Once the one or more service advertisers 401 received the announced service request, they can publish their own service scheduling information to its neighboring devices through device 402. For example, the scheduling information may include a timetable and location and ranging information, which is related to when and where the specific service is provided. In step 423, the scheduling information is sent to service announcer 402, which announcer the service advertisement to service seeker 403 in step 424. Once service seeker 403 receives the announced service advertisement, it can select a preferred service and start to negotiate with the selected service advertiser 401 to reach a final schedule that the service will be provided. In step 441, the service is provided by device 401 to device 403 according to the final schedule negotiated between them.

Figure 5:
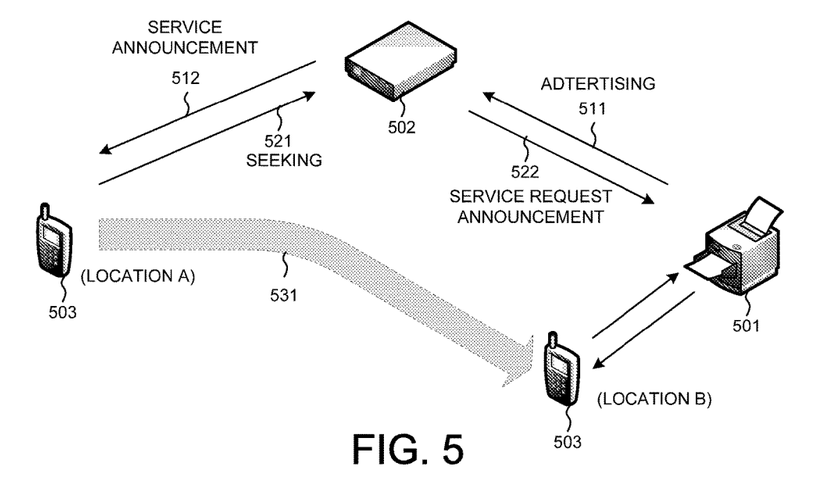
FIG. 5 illustrates one example of enhanced service discovery using a proxy agent based on Neighbor Awareness Networking (NAN).

FIG. 5 illustrates one example of enhanced service discovery using a proxy agent based on Neighbor Awareness Networking (NAN). Neighbor Awareness Networking (NAN) is a device-centric discovery that allows devices to find out information from each other directly with very low power consumption. In NAN, devices can distribute and acquire any tiny pieces of information without the need for connections. Information about devices, their services and users is determined in the pre-association state. In the example of FIG. 5, mobile communications devices 501, 502, and 503 belong to the same NAN. Device 501 is a service advertiser, e.g., providing photo printing service. Device 503 is a service subscriber, e.g., seeking photo printing service. Device 502 is a peer mobile device of device 501 and device 503.

In one advantageous aspect, device 501 and device 503 are devices with very low power consumption, and utilizes device 502 as a proxy agent for efficient service discovery. For example, device 501 enters sleep mode with long sleep window and sends out service advertisement periodically. Similarly, device 503 enters sleep mode with long sleep window and sends out service subscription request periodically. On the other hand, device 502 remains active or have very short sleeping windows. Device 502 is then used as a proxy agent to announce the service advertisement for device 501 (as depicted by 511 and 512), or announce the service request for device 503 (as depicted by 521 and 522). Device 501 and device 503 can wake up based on their original schedule or a final negotiated schedule for service. As a result, device 501 and device 503 can remain very low power consumption while still able to have fast service discovery.

In another advantageous aspect, device 501 and device 503 are located beyond the reach of radio signals from each other and thus are hidden from each other. On the other hand, device 502 is located in between the two devices and are able to transmit and receive radio signals to/from both of the devices. Device 502 is then used as a proxy agent to announce the service advertisement for device 501 (as depicted by 511 and 512), or announce the service request for device 503 (as depicted by 521 and 522). Device 502 also provides scheduling information, location information, and ranging information with respect to the service provided by device 501. Later on, device 503 can move from its original location (Location A) to a new location (Location B) that is closer to device 501 at a scheduled service time (as depicted by 531). As a result, the maximum service advertising range is twice longer and coverage is four-times larger.

Figure 6:
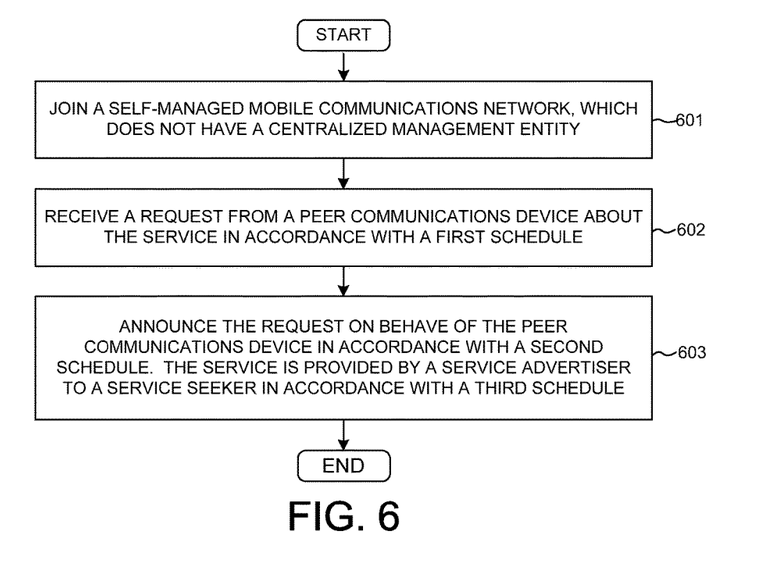
FIG. 6 is flow chart of a method of enhanced service discovery from service announcer perspective in accordance with a novel aspect.

FIG. 6 is flow chart of a method of enhanced service discovery from service announcer perspective in accordance with a novel aspect. In step 601, a mobile communications device joins a self-managed communications network, which does not have a centralized management entity. In step 602, the mobile device receives a request from a peer communications device about publishing a service or subscribing to a service in accordance with a first schedule. In step 603, the mobile device announce the request on behalf of the peer communications device in accordance with a second schedule. The service is then provided by a service advertiser to a service seeker in accordance with a third schedule.

Figure 7:
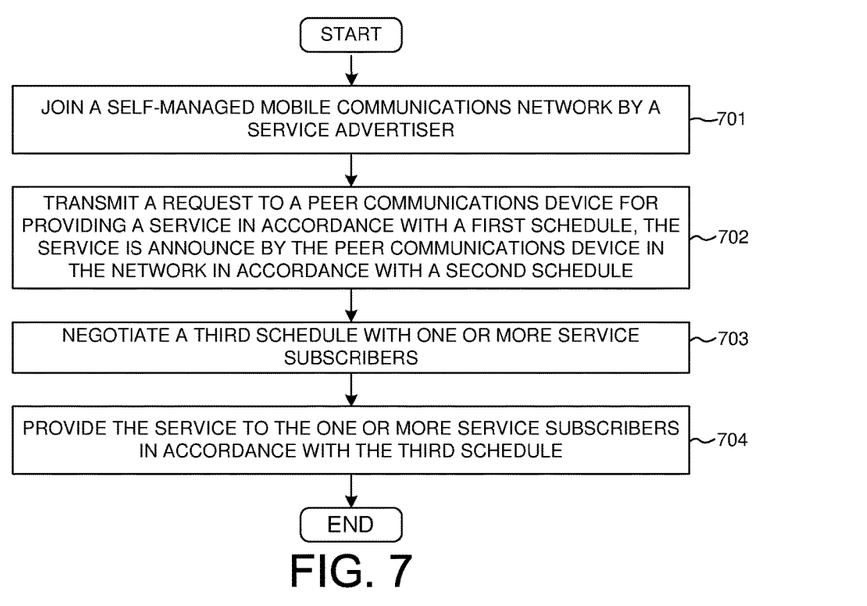
FIG. 7 is flow chart of a method of enhanced service discovery from service advertiser perspective in accordance with a novel aspect.

FIG. 7 is flow chart of a method of enhanced service discovery from service advertiser perspective in accordance with a novel aspect. In step 701, a service advertiser joins a self-managed mobile communications network. In step 702, the service advertiser transmits a request to a peer communications device for providing a service in accordance with a first schedule. The service is then announced by the peer communications device on behalf of the service advertiser in the network, in accordance with a second schedule. In step 703, the service advertiser negotiates a third schedule with one or more service subscribers. In step 704, the service advertiser provides the service to a service subscriber in accordance with the third schedule.

Figure 8:
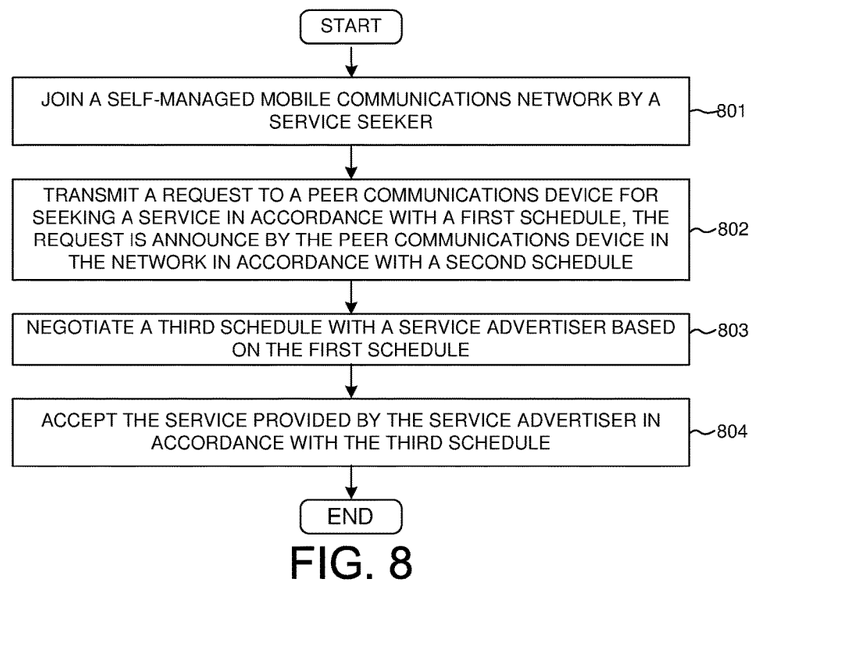
FIG. 8 is flow chart of a method of enhanced service discovery from service seeker perspective in accordance with a novel aspect.

FIG. 8 is flow chart of a method of enhanced service discovery from service seeker perspective in accordance with a novel aspect. In step 801, a service seeker joins a self-managed mobile communications network. In step 802, the service seeker transmits a request to a peer communications device for seeking a service in accordance with a first schedule. The request is then announced by the peer communications device on behalf of the service seeker in the network, in accordance with a second schedule. In step 703, the service seeker negotiates a third schedule with a service advertiser based on the first schedule. In step 804, the service seeker accepts the service provided by the service advertiser in accordance with the third schedule.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method for discovering services in a self-managed mobile communications network, comprising:
   joining a self-managed mobile communications network;
   receiving a request from a peer communications device to announce a service provided by the peer communications device, wherein the service is available in accordance with a first schedule of the peer communications device, wherein the first schedule comprises ranging information of the service provided by the peer communication device; and
   announcing the service with the first schedule, including the ranging information, of the peer communications device on behalf of the peer communications device in accordance with a second schedule, wherein the service is provided by the peer communications device in accordance with a third schedule, and wherein the third schedule is negotiated by the peer communications device with one or more service subscribers based on the first schedule of the peer communications device, announced with the service before, received by the one or more service subscribers.

2. The method of claim 1, wherein the first schedule comprises time information of when the peer communications device is available to provide the service.

3. The method of claim 1, wherein the first schedule comprises location information of the peer communications device.

4. The method of claim 1, wherein the third schedule is further negotiated by the peer communications device with the one or more service subscribers based on the ranging information.

5. A method for discovering services in a self-managed mobile communications network, comprising:
   joining a self-managed mobile communications network by a communications device;

receiving a request from a peer communications device to seek a service, where the service is needed in accordance with a first schedule;

announcing the request on behalf of the peer communications device in accordance with a second schedule; and forwarding scheduling information and ranging information of a service advertiser to the peer communications device, wherein the service is provided by the service advertiser in accordance with a third schedule, and wherein the third schedule is negotiated between the peer communications device and the service advertiser based on the scheduling information of the service advertiser received by the peer communications device.

6. The method of claim 5, wherein the first schedule comprises time information of when the peer communications needs the service.

7. The method of claim 5, wherein the communications device sends location information of the service advertiser to the peer communications device.

8. The method of claim 5, wherein the third schedule is further negotiated between the peer communications device and the service advertiser based on the ranging information.

9. A method, comprising:
joining a self-managed mobile communications network by a communication device that is a service advertiser;

transmitting a request to a peer communications device for providing a service in accordance with a first schedule of the service advertiser, wherein the first schedule comprises ranging information of the service provided by the service advertiser, and wherein the service with the first schedule, including the ranging information, of the service advertiser is announced by the peer communications device in the network in accordance with a second schedule;

negotiating a third schedule with one or more service subscribers receiving the announced service with the first schedule of the service advertiser from the peer communications device; and providing the service to the one or more service subscribers in accordance with the third schedule.

10. The method of claim 9, wherein the first schedule comprises time information of when the service advertiser is available to provide the service.

11. The method of claim 9, wherein the first schedule comprises location information of the service advertiser.

12. The method of claim 9, wherein the third schedule is negotiated with the one or more service subscribers receiving the announced service based on the ranging information.

13. The method of claim 9, wherein the service advertiser determines when to go to power-saving mode based on the first schedule and the third schedule.

14. A method, comprising:
joining a self-managed mobile communications network by a communications device that is a service seeker;

transmitting a request to a peer communications device for seeking a service in accordance with a first schedule, wherein the request is announced by the peer communications device in the network in accordance with a second schedule;

receiving scheduling information and ranging information of a service advertiser from the peer communications device;

negotiating a third schedule with the service advertiser based on the first schedule received from the peer communications device; and accepting the service provided by the service advertiser in accordance with the third schedule.

15. The method of claim 14, wherein the first schedule comprises time information of when the service seeker needs the service.

16. The method of claim 14, wherein the service seeker receives timing information and location information of the service provided by the service advertiser.

17. The method of claim 16, wherein the service seeker wakes up to negotiate the third schedule based on the received timing information.

18. The method of claim 14, wherein the third schedule is further negotiated based on the ranging information.

19. The method of claim 18, wherein the service seeker moves towards the service advertiser based on the location information and the ranging information to receive the service.

* * * * *